US008091584B2

(12) United States Patent
Marly

(10) Patent No.: US 8,091,584 B2
(45) Date of Patent: Jan. 10, 2012

(54) ACTUATOR POSITION CONTROL DEVICE USING A FAIL FREEZE SERVO-VALVE

(75) Inventor: Pascal Marly, Melun (FR)

(73) Assignee: SNECMA, Paris (FR)

( * ) Notice: Subject to any disclaimer, the term of this patent is extended or adjusted under 35 U.S.C. 154(b) by 845 days.

(21) Appl. No.: 12/052,454

(22) Filed: Mar. 20, 2008

(65) Prior Publication Data

US 2008/0230127 A1 Sep. 25, 2008

(30) Foreign Application Priority Data

Mar. 21, 2007 (FR) ...................................... 07 53960

(51) Int. Cl.
*F16K 11/07* (2006.01)

(52) U.S. Cl. .......... 137/625.68; 137/625.63; 137/625.64

(58) Field of Classification Search ............. 137/625.63, 137/625.64, 625.68
See application file for complete search history.

(56) References Cited

U.S. PATENT DOCUMENTS 3,034,483 A * 5/1962 Rasmussen .............. 137/625.64
3,081,787 A * 3/1963 Meulendyk .............. 137/625.68
3,234,968 A * 2/1966 Frantz ...................... 137/625.63
3,282,283 A * 11/1966 Takeda ..................... 137/625.63
3,596,560 A * 8/1971 Butterworth ............. 137/625.68
3,910,314 A * 10/1975 Nicholson ................ 137/625.64
3,922,955 A 12/1975 Kast
4,227,443 A * 10/1980 Toot ......................... 137/625.64
4,827,981 A * 5/1989 Livecchi et al. ......... 137/625.64
5,156,189 A * 10/1992 Tranovich ................ 137/625.68
5,477,878 A * 12/1995 Hashida et al. ............... 137/504
6,640,833 B2 * 11/2003 Brocard et al. .......... 137/625.63
2007/0023093 A1 2/2007 Shelby et al.

FOREIGN PATENT DOCUMENTS

FR 2 818 331 A1 6/2002
GB 1 532 725 11/1978

* cited by examiner

*Primary Examiner* — Craig Schneider
*Assistant Examiner* — Craig J Price
(74) *Attorney, Agent, or Firm* — Oblon, Spivak, McClelland, Maier & Neustadt, L.L.P.

(57) ABSTRACT

The actuator (50) comprises a slide (52) carrying at least two stages (54, 56) and being capable of sliding in a cylinder and two control chambers (62, 64) connected to respective use holes (U1, U2) of an electrically controlled servo-valve hydraulic distributor (20). The control chambers (62, 64) are each situated on one side of a respective stage and an intermediate chamber connected to high or low pressure is situated between the other sides of the stages. In the event of electrical control failure, the distributor (20) slide is taken to a safety position in which the control chambers (62, 64) of the actuator (50) are at the same low or high pressure opposed to that applying in the intermediate chamber (66) so that each stage of the actuator slide is then subjected to high pressure on one side and to low pressure on the other side. Sealing between each actuator slide stage (54, 56) and the actuator cylinder (60) is carried out by a dynamic seal (70) producing a frictional force between stage and cylinder, depending on the difference between the pressures exerted on the two sides of the stage so that, in the event of electrical control failure, the actuator slide valve is immobilized in its position at the moment of the failure ("fail freeze"). The actuator (50) can be an aeronautical engine fuel metering unit.

5 Claims, 3 Drawing Sheets

ACTUATOR POSITION CONTROL DEVICE USING A FAIL FREEZE SERVO-VALVE

BACKGROUND OF THE INVENTION

This invention relates to the position control of an actuator by means of an electrically controlled servo-valve.

A particular field of application of the invention is that of position control of actuators used in aeronautical engines, especially for metering fuel or for adjusting variable setting angle guide vanes or nozzle flaps in gas turbine engines.

For these applications, the "freezing" of the position of a controlled element is requested in the event of electrical failure at the servo-valve control, to provide safety operation and so that the position occupied before the failure can be found again when it has been possible to rectify the failure.

Servo-valves with what is termed position memory in the event of a failure (or "fail freeze" servo-valves) are well known. In particular, it will be possible to refer to document FR 2 818 331. In this document, the servo-valve comprises a distributor which, in the event of an electrical control failure, comes into a position in which distributor use holes connected to actuator control chambers are closed. A drift from the actuator's "frozen" position is difficult to avoid, due to leaks of the hydraulic fluid contained in the control chambers.

OBJECT AND SUMMARY OF THE INVENTION

The aim of the invention is to propose an actuator device controlled by an electrically controlled servo-valve, in which the position of the actuator can be frozen in the event of an electrical failure without substantial risk of drift.

This aim is achieved due to a device comprising:

- an electrically controlled servo-valve comprising a hydraulic distributor having at least one high pressure supply hole, at least one low pressure outlet and at least two use holes, each use hole being connectable to high pressure or low pressure, depending on the controlled position of a slide in the hydraulic distributor and
- an actuator comprising a slide carrying at least two stages and capable of sliding in a cylinder, the actuator having two control chambers connected to respective use holes in the servo-valve distributor and each situated on one side of a respective stage and an intermediate chamber connected to high or low pressure and situated between the other sides of the stages,
- the hydraulic distributor slide being taken, in the event of an electrical control failure, to a safety position in which it causes the immobilization of the actuator slide substantially in its position at the time of the failure, a device in which:

- in the safety position of the hydraulic distributor slide, the actuator control chambers are taken, by means of their connection with the distributor use holes, to a same low or high pressure opposed to that applying in the intermediate chamber so that each stage of the actuator slide is then subjected to high pressure on one side and to low pressure on the other side, and
- the sealing between each of the said stages of the actuator slide and the actuator cylinder is provided by a dynamic seal producing a frictional force between stage and cylinder, depending on the difference between the pressures exerted on the two sides of the stage.

Advantageously, the actuator intermediate chamber is connected to high pressure and, in its safety position, the distributor slide connects the distributor use holes to low pressure.

Thus, the frozen position of the actuator slide is not affected by leaks. Minor leaks of the seals do not change the pressure differential value which applies to the dynamic seals and thus the frictional force which "freezes" the actuator slide position.

The invention is especially applicable to a fuel flow control device in an aeronautical engine, the actuator forming a fuel metering device with an intermediate chamber connected to a high pressure fuel source and having an outlet hole, of which the cross section of flow is a function of the actuator slide position.

In such an application, the dynamic seals also offer the advantage of preventing leaks of the flow of metered fuel.

BRIEF DESCRIPTION OF THE DRAWINGS

The invention will be understood better when the description given below, on a guiding but non-limiting basis, is read, with reference to the attached drawings in which.

DETAILED DESCRIPTION OF EMBODIMENTS

An embodiment of the invention will be described with reference to FIGS. 1 to 3 and 4A-4F in the context of application to metering (flow control) of fuel for an aeronautical engine fuel injection system.

Figure 1:
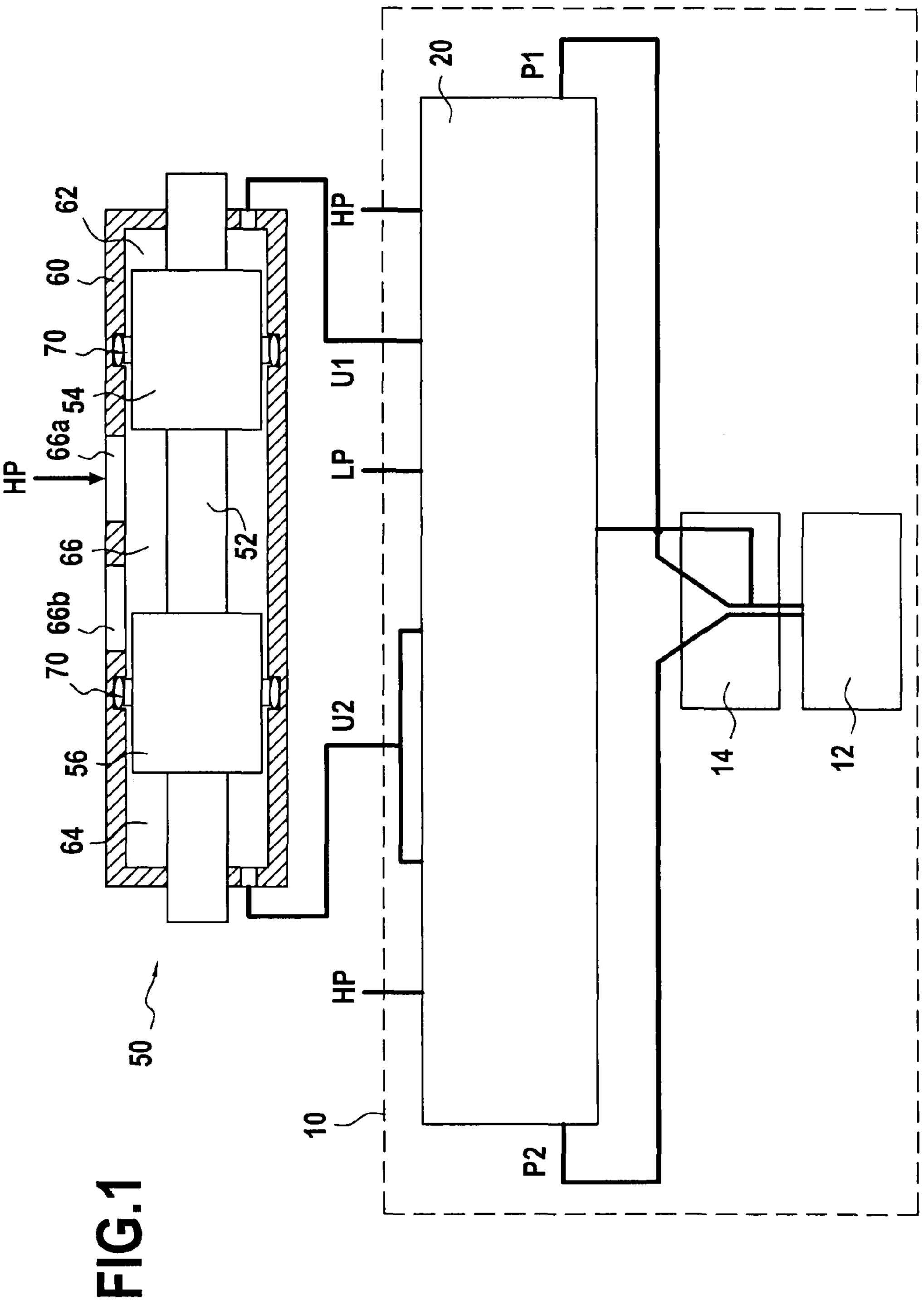
FIG. 1 schematically illustrates a device with servo-valve and actuator according to an embodiment of the invention.

FIG. 1 schematically shows a servo-valve device 10 controlling an actuator 50 forming a fuel metering unit.

The servo-valve 10 is electrically controlled and comprises an electric motor element, for example an electric torque motor 12, a hydraulic distributor 20 and associated hydromechanical elements (hydraulic potentiometer and mechanical negative follow-up) which form the pilot control element 14 of the distributor 20.

The hydraulic distributor 20, a particular embodiment of which is described below, comprises a slide which can move with linear translational motion in a cylinder. The distributor 20 comprises holes connected to a double high pressure (HP) supply and to an outlet (or low pressure (LP) tank return), use outlets U1, U2 connected to the metering unit 50 and pilot control inlets P1, P2 opening into pilot control chambers situated at the ends of the distributor 20. The pilot control inlets P1, P2 are connected to the pilot control element 14, the pressures applied by the latter to the inlets P1, P2 acting in opposition to each other in order to control the displacement of the distributor slide. The hydraulic fluid used can be the fuel.

The fuel metering unit 50 comprises a slide 52 carrying two stages 54, 56 and being capable of sliding in a cylinder 60. The stages 54, 56 divide the internal volume of the cylinder 60 into two control chambers 62, 64 situated at the ends of the cylinder 60 and into an intermediate chamber 66, between the stages 54, 56. The control chambers 62, 64 are connected by control lines to the use outlets U1, U2.

The intermediate chamber 66 is connected via a supply hole 66*a* to the high pressure (HP) supply (high pressure fuel supply source) and via a use hole 66*b* to a fuel injection pipe. The degree of closing of the use hole 66*b* by the stage 56 determines the flow metered.

A servo-valve/fuel metering unit assembly as described above is known per se.

In the event of failure of servo-valve electrical excitation, the hydraulic distributor slide comes into a position in which the same pressure, in the present case low pressure, is available at use outlets U1 and U2. Each stage 54, 56 of the metering unit 50 is then subjected, on one side to low pressure and, on the other side, to high pressure.

Sealing between the stages 54, 56 and the cylinder 60 is carried out by means of dynamic seals producing a frictional force between stage and cylinder, depending on the difference between the pressures exerted on the two sides of each one of the stages. Thus, in the event of failure of servo-valve electrical excitation, this difference in pressure is at the maximum (difference between HP and LP), so the frictional force is also at the maximum. The position of the slide 52 at the time of the failure can therefore be preserved without the risk of substantial drift, so that the fuel flow rate is frozen at its value at the moment of the failure.

Figure 2A:
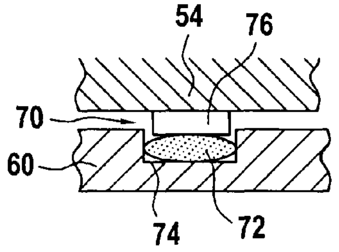
FIGS. 2A and 2B are enlarged cutaway detail views of a type of dynamic seal which can be used for sealing between the slide and the cylinder of the actuator in FIG. 1.
Figure 2B:
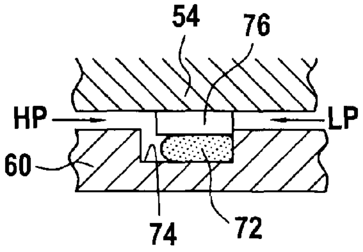

FIGS. 2A and 2B show in a more detailed manner an embodiment of such a dynamic seal 70. In a manner known per se, the latter comprises an O-ring 72 housed in a groove 74 formed in the internal wall of the cylinder 60 and a ring 76 housed at least partly in the groove 74, supported on the O-ring 72. The O-ring 72 is made of an elastomer, for example Viton®. FIG. 2A shows the seal 70 when the pressures applied on the two sides of the seal are equal or hardly different. Under the effect of a great difference in pressure between the two sides of the seal 70 (FIG. 2B), the O-ring deforms and exerts on the ring 76 a force tending to increase the force exerted on the adjacent stage (stage 54 for example). The ring 76 is preferably made of a material with a low coefficient of friction, polytetrafluoroethylene (PTFE) for example. Of course, in a variant, the groove housing the O-ring could be formed in the stage.

With the use of dynamic seals, it is also possible to improve the sealing between the stages 54, 56 and the cylinder 60 in normal operation of the metering unit, reducing the requirements of tolerances on the dimensions.

Figure 3:
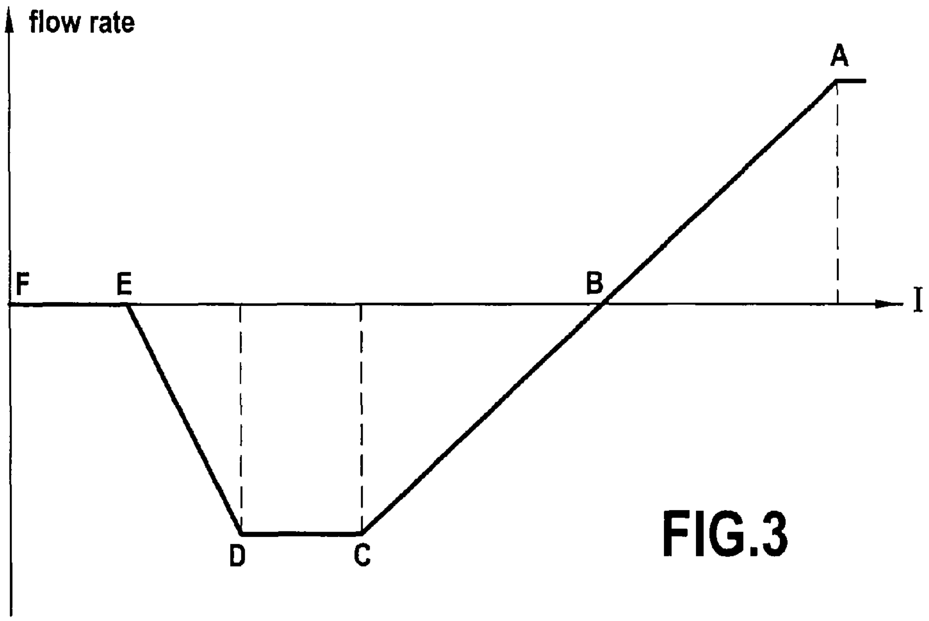
FIG. 3 shows a relationship between the intensity of a servo-valve control electric current and various different operation points.
Figure 4A:
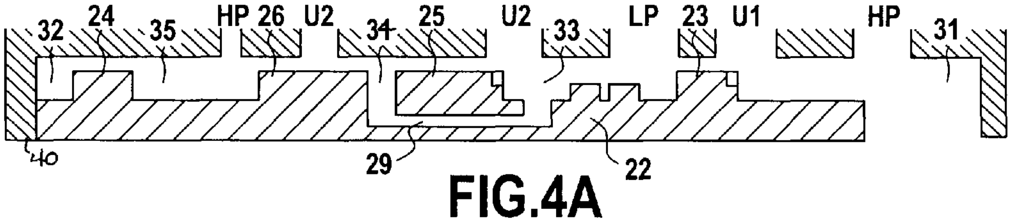
FIGS. 4A to 4F are views very schematically showing configurations of a hydraulic distributor of the servo-valve in FIG. 1 for various different operation points in FIG. 3.
Figure 4B:
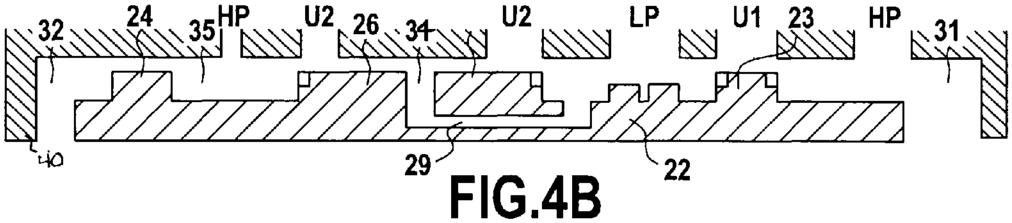
Figure 4C:
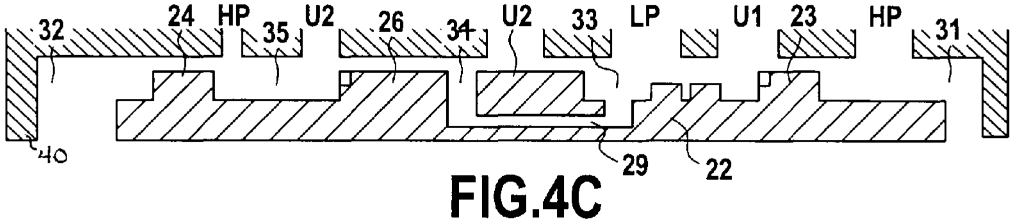
Figure 4D:
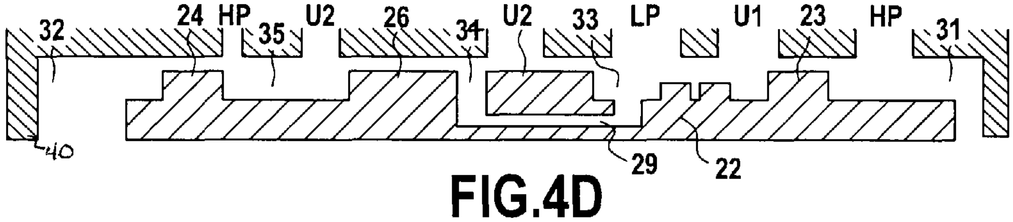
Figure 4E:
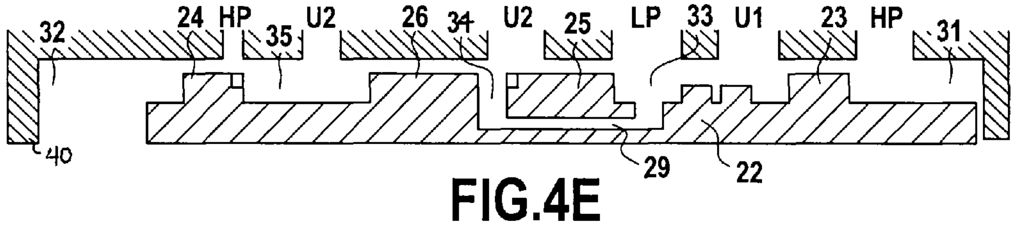
Figure 4F:
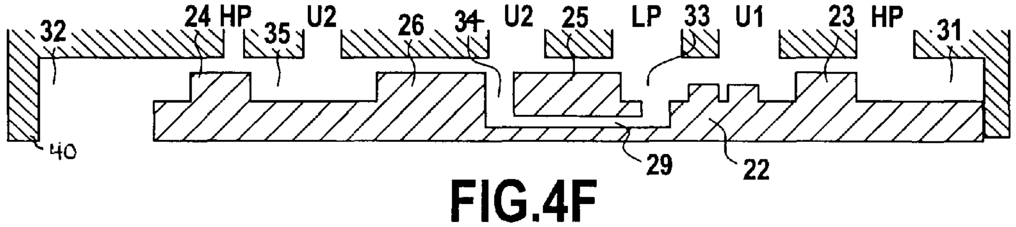

An example of variation of the flow rate of fuel metered as a function of the intensity of an excitation current of the electric motor element 12 is shown in FIG. 3.

The operation points A, B, C, D, E and F correspond to the following respectively: the maximum flow rate (A), the stationary rate (B), the limits of a minimum flow rate range (C-D) and the limits (E-F) of the position "freeze" ("fail freeze") range, when the intensity of the excitation current becomes too low or nil.

FIGS. 4A to 4F show the positions of the hydraulic distributor slide 22 with respect to the cylinder 40 of this same distributor 20 for the various different operation points A to F, respectively, which positions are controlled by the pilot control element 14 under the action of the electric motor element 12.

In position A, the slide 22 is at a first end of its stroke in the cylinder 40, the positive difference between the pressures applying in the pilot control chambers 31, 32 at the ends of the cylinder being at the maximum. The pilot control chambers 31, 32 are defined by the ends of the cylinder 40 and of the respective stages 23, 24 carried by the slide 22. The use outlet U2 (which here comprises two separate bores formed in the wall of the cylinder 40) communicates with low pressure LP via a LP chamber 33 which is situated between the stage 23 and a stage 25 and in which the outlet opens. The use outlet U1 communicates with high pressure HP via the pilot control chamber 31.

In position B, the slide 22 closes the use outlet U1 with the stage 23 and the two bores forming the use outlet U2 with the stage 25 and a stage 26.

In positions C and D, the slide 22 puts the use outlet U2 in communication with high pressure via a HP chamber 35 situated between the stages 24 and 26, whereas the use outlet 31 opens in LP chamber 33.

In positions E and F, the slide 22 puts the LP chamber 33 in communication with the use outlet U1 and with the use outlet U2 via a passage 29 formed in the slide valve 22 and connecting the LP chamber 33 to a chamber 34 situated between the stages 25 and 26. In position F, the slide 22 is at the other end of its stroke in the cylinder 40.

Of course, the operation profile in FIG. 3 and the internal arrangement of the servo-valve distributor described above are given simply by way of examples, other forms being possible provided that, in the event of failure of electrical excitation of the servo-valve 10, the slide of the hydraulic distributor 20 comes into a safety position in which, in the present case, the use outlets U1 and U2 are both at low pressure to provide the "freezing" of the position of the metering unit 50.

The invention is, of course, applicable to hydraulic actuators other than fuel metering units for aeronautical engines, as the actuator position can be "frozen" by application, in two control chambers of the actuator, of a pressure (LP or HP) opposed to that applying in an intermediate chamber with sealing by dynamic seals between the intermediate chamber and each of the control chambers.

The invention claimed is:

1. An actuator position control device comprising:

an electrically controlled servo-valve including a hydraulic distributor having at least one high pressure (HP) supply hole, at least one low pressure (LP) outlet and at least two use holes, each use hole being connectable to high pressure or low pressure, depending on the controlled position of a slide of the hydraulic distributor; and an actuator including a slide carrying at least two stages and being slidable in a cylinder, the actuator having two control chambers connected to respective use holes of the servo-valve distributor and each situated on one side of a respective stage and an intermediate chamber connected to high or low pressure and situated between another side of each of the said stages, the hydraulic distributor slide being taken, in the event of electrical control failure, to a safety position in which it causes the immobilization of the actuator slide substantially in its position at the moment of the failure, wherein in the safety position of the hydraulic distributor slide, the actuator control chambers are taken, via their connection with the distributor use holes, to a same low or high pressure opposed to a pressure applied in the intermediate chamber so that each actuator slide stage is then subjected to high pressure on one of the sides and to low pressure on the other side, and sealing between each of the said stages of the actuator slide and the actuator cylinder is carried out by a dynamic seal which is elastically deformable under an effect of a pressure difference between the sides of each of the said stages to produce a frictional force between each of the said stages and the cylinder, which increases as a function of the difference between the pressures exerted on the two sides of the stage.

2. The actuator position control device according to claim 1, wherein the actuator intermediate chamber is connected to high pressure and, in its safety position, the distributor slide connects the distributor use holes to low pressure.

3. The actuator position control device according to claim 1, wherein the dynamic seal further comprises:

a first O-ring and a second ring both housed in a groove, the second ring being supported by the first O-ring and contacting the slide stage, the first O-ring being made of an elastically deformable material allowing it to be deformed under the effect of the pressure difference between the sides of each slide stage and to exert a pressure on the second ring producing said frictional force between each stage and the cylinder.

4. An aeronautical engine comprising an actuator position control device according to any of claims 1,2, or 3.

5. A fuel flow control device in an aeronautical engine, comprising an actuator position control device according to claim 1,2, or 3, in which the actuator forms a fuel metering unit, the intermediate chamber being connected to a high pressure fuel source and having an outlet hole, of which the cross section of flow is a function of the actuator slide valve position.

* * * * *